United States Patent
Fritsch et al.

(10) Patent No.: US 7,192,224 B2
(45) Date of Patent: Mar. 20, 2007

(54) DRILLING TOOL

(75) Inventors: Andree Fritsch, Freudental (DE); Jacek Kruszynski, Stuttgart (DE); Frank Roeser, Gemmrigheim (DE); Henry Schuett, Sachsenheim (DE); Benno Spors, Marbach (DE); Juergen Heilmann, Erligheim (DE); Peter Leuze, Walheim (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 284 days.

(21) Appl. No.: 10/312,603

(22) PCT Filed: Jun. 16, 2001

(86) PCT No.: PCT/EP01/06830

§ 371 (c)(1),
(2), (4) Date: Sep. 2, 2003

(87) PCT Pub. No.: WO02/00381

PCT Pub. Date: Jan. 3, 2002

(65) Prior Publication Data

US 2004/0028491 A1 Feb. 12, 2004

(30) Foreign Application Priority Data

Jun. 27, 2000 (DE) ................. 100 30 297

(51) Int. Cl.
*B23B 51/02* (2006.01)

(52) U.S. Cl. .................. 408/227; 408/233; 408/713

(58) Field of Classification Search ............. 408/227, 408/230–231, 233, 713; B23B 51/02
See application file for complete search history.

(56) References Cited

U.S. PATENT DOCUMENTS

| 1,746,716 | A | * | 2/1930 | Wilhelm | 408/59 |
| 2,074,459 | A | * | 3/1937 | Cole et al. | 408/151 |
| 3,625,624 | A | * | 12/1971 | Fitzsimmons | 408/116 |
| 4,043,697 | A | * | 8/1977 | Eckle | 408/182 |
| 4,101,239 | A | * | 7/1978 | Wohlhaupter | 408/182 |
| 4,231,691 | A | * | 11/1980 | Pape et al. | 408/185 |

(Continued)

FOREIGN PATENT DOCUMENTS

| DE | 36 11 999 | 10/1987 |
| DE | 299 11 254 | 9/1999 |
| DE | 299 11 894 | 9/1999 |
| DE | 299 20 573 | 4/2000 |

*Primary Examiner*—Monica Carter
*Assistant Examiner*—Eric A. Gates
(74) *Attorney, Agent, or Firm*—Flynn, Thiel, Boutell & Tanis, P.C.

(57) ABSTRACT

A double or multiple-edged drilling tool has a base body rotatable about a drilling axis, and at least two plate seats arranged on the front face for accommodating identical interchangeable cutting plates. The cutting plates each have a machining face, and a clearance face adjoining a principal cutting edge forming a cutting wedge, and a seat face facing away from the clearance face. A guiding land adjoins radially outwardly through each edge the machining face, the clearance face and optically the seat face. The cutting plates each have a hole for a retaining screw which is screwed into a threaded bore at the front face of the base body. The holes are aligned with their axis perpendicular to the clearance face of the associated cutting plates the threaded bores are aligned inclined to the drilling axis and inclined to each other in the base body.

22 Claims, 7 Drawing Sheets

U.S. PATENT DOCUMENTS

| | | | | |
|---|---|---|---|---|
| 4,242,018 A | * | 12/1980 | Schurfeld | 408/182 |
| 4,585,375 A | | 4/1986 | Erkfritz | |
| 4,632,609 A | * | 12/1986 | Johne | 408/197 |
| 4,648,760 A | * | 3/1987 | Karlsson et al. | 408/223 |
| 4,684,298 A | * | 8/1987 | Roos | 408/59 |
| 4,756,649 A | * | 7/1988 | Heule | 408/178 |
| 4,768,901 A | * | 9/1988 | Reinauer et al. | 408/200 |
| 4,950,108 A | * | 8/1990 | Roos | 408/59 |
| 4,961,672 A | | 10/1990 | Lindberg | |
| 5,188,490 A | * | 2/1993 | Muendlein et al. | 408/146 |
| 5,330,297 A | * | 7/1994 | Engstrand | 408/153 |
| 5,873,683 A | * | 2/1999 | Krenzer | 408/230 |
| 5,944,462 A | * | 8/1999 | Woodward | 409/74 |
| 5,947,660 A | * | 9/1999 | Karlsson et al. | 408/230 |
| 6,132,146 A | | 10/2000 | Satran et al. | |
| 6,220,794 B1 | * | 4/2001 | Calamia et al. | 407/40 |
| 6,270,292 B1 | | 8/2001 | Satran et al. | |

* cited by examiner

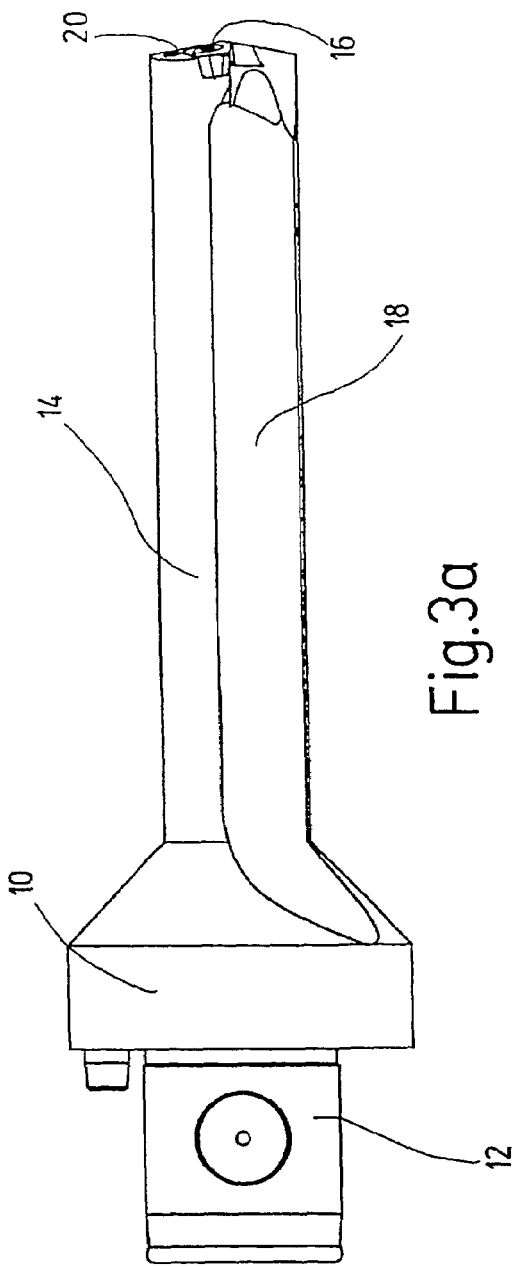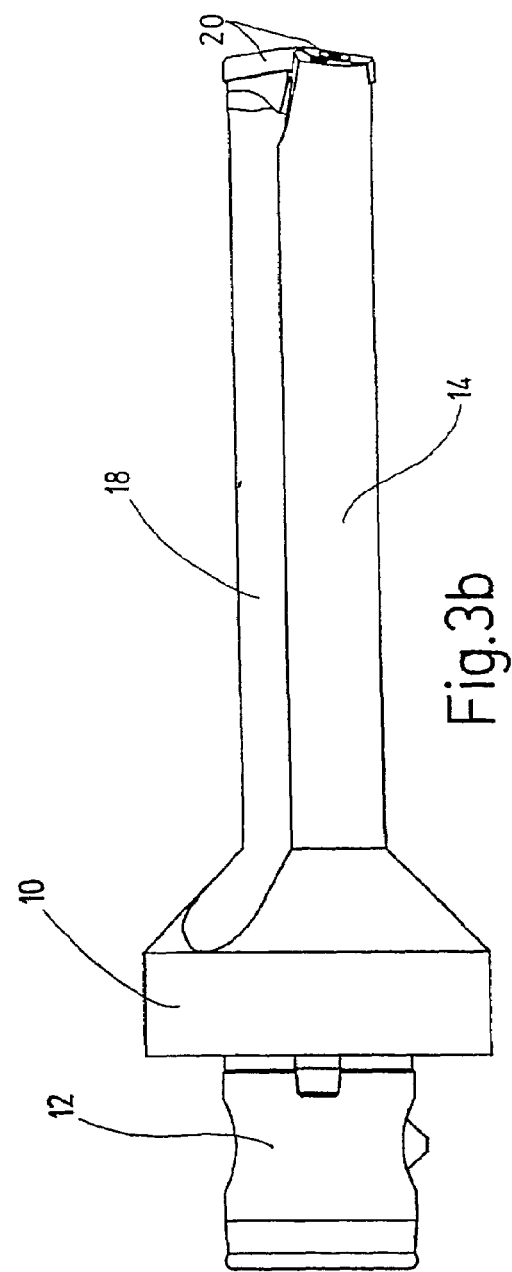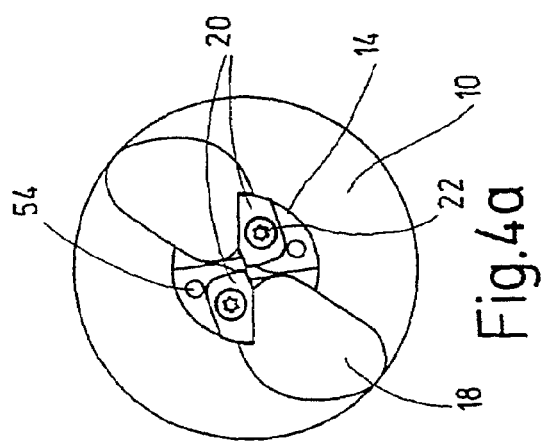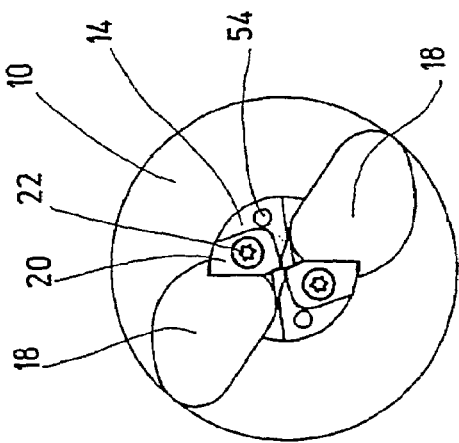

DRILLING TOOL

DESCRIPTION

The invention relates to a drilling tool comprising a base body which can be rotated about a drilling axis, comprising at least two plate seats arranged on the front face in the base body, and comprising cutting plates which can be interchangeably inserted into the plate seats, and are preferably identical, and which cutting plates each have a machining face and clearance face adjoining a principal cutting edge, a seat face facing away from the clearance face, and a guiding land adjoining radially on the outside through each edge thereof the machining face, the clearance face and optionally the seat face, and a hole which extends through the clearance face and the seat face for a retaining screw which can be screwed into a threaded bore which is open to the front face of the base body in the area of the plate seats.

Drilling tools of this type are mostly used as double or multiple-edged solid drills, which are constructed similar to a twist drill, however, with interchangeable cutting plates. The cutting plates, which are screwed on the front face into the drill bit, have in the area of their cutting edges a set angle which assures that the drill is centered in the bore. The cutting plates have in the conventional drilling tools of this type (DE-A-3611999, U.S. Pat. No. 4,961,672) a complicated plate form which can only be manufactured via hard-metal injection die-casting technology. Since the hard metal is brittle, the cutting plates consisting thereof may not be stressed with respect to bending. Such bending loads are supposed to be avoided with the complicated plate forms of the state of the art. Because of their complicated form, the cutting plates are expensive to manufacture and are therefore disproportionately expensive for mass usage. The fastening screws extend there throughout into threaded bores of the base body, which threaded bores are aligned axially parallel to the drilling axis. The holes in the cutting plates are accordingly aligned inclined to the respective clearance face. Double or multiple cutting edges are designed with a high forward feed for high machining performances. Correspondingly high are the reaction forces to be transferred through the cutting plates into the base body. The plate seats of the known drills are designed with rather thin walls in the area of their seat edges, and therefore lead to problems during longer machining times because of the demanded machining performances.

Based on this, the basic purpose of the invention is to provide a double or multiple-edged drilling tool of the above-disclosed type which enables the use of cutting plates having a simple plate form, yet permits even in the case of high machining performances an optimum coupling of the forces engaging the cutting plates during the machining operation into the base body.

To attain this purpose the characteristics disclosed in patent claim 1 are suggested. Advantageous embodiments and further developments of the invention result from the dependent claims.

The basic thought of the invention is that the plate form can be simplified during an optimum force introduction by the holes being aligned with their axes perpendicularly to the clearance face of the associated cutting plates, and by the axes of the threaded bores being aligned inclined with respect to the drilling axis and inclined to each other in the base body. Threaded bores are advantageously placed where there is sufficient material in the base body. Consideration must thereby be given that the base body has through the existing flutes on the one hand and through coolant bores on the other hand still further structural constructions, which leaves only a limited possibility to orient the threaded bores. A further thought is that the plate seats are placed into the base body in such a manner that the principal cutting forces accumulating due to the machining are introduced through the cutting plates distortion-free onto the plate seats or into the base body. The clearance faces and the seat face of the individual cutting plates are according to a preferred embodiment of the invention aligned in parallel planes so that the hole with its axis is also aligned perpendicularly to the seat face. From this follows that the axes of the threaded bores are aligned inclined to the drilling axis and to each other. The threaded bores in the base body are preferably directed from their front-face opening inclined in direction of an axially parallel plane extending through the principal cutting edge of the associated cutting plate, and inclined in direction of an axially parallel plane perpendicular to and extending through the axis of the base body. By inclining the threaded bores in the base body, the point angle of the drill and of the clearance-face angle is with plane-parallel cutting plates pregiven. Due to the plane-parallel cutting plates, all parameters important for the cutting operation are defined by the plate seat, whereas the bore diameter is defined by the radial position of the guiding land on the cutting plate.

The principal cutting edges of the cutting plates lead in cutting direction of the drill a center plane, which is parallel to these and to the drilling axis, whereby the cutting plates are arranged mirror-symmetrically with respect to the drilling axis on the drill body.

The adjacent cutting plates have in the area of the drilling axis a distance of less than 0.2 mm, preferably 0.05 to 0.15 mm from each other. The radially inner part of the cutting edge is chamfered in such a manner that a type of an auxiliary cutting edge results in the central region, which cuts around the center. Thus a minimum slug or peg remains standing during the drilling operation, the diameter of which slug or peg is less than 0.1 mm. This peg is not machined but in the case of most materials it is crumbled. Mainly in the case of workpieces made out of a tough material, like special steel, the crumbling occurs only when the distance between the plates is correspondingly small. It has been proven that at a plate spacing of 0.1 mm even in the case of blind-hole bores no peg remains in the center. Rather the peg is completely crumbled so that no finish machining is needed. A further improvement in this respect is achieved when a deflecting incline which, starting out from the cutting plates, ends in one of the chip-conveying grooves and is arranged asymmetrically with respect to the drilling axis, is formed into the base body in the space between the two cutting plates.

In order to guarantee a constant force coupling of the cutting plates into the base body without load peaks, it is suggested according to the invention that the cutting plates are form-lockingly fitted with at least two edge faces defining an angle with each other into the associated plate seat. The retaining screws have thereby advantageously a flat head fitted into a conical recess in the area of the hole, whereby the flat-head fit and the seat fit are reciprocally offset in order to produce a press fit. The two edge faces form-lockingly fitted into the plate seat define advantageously an angle of 80° to 100°, preferably of 90° with each other, and are advantageously connected to each other through a rounded corner. The rounded contour of the seat edges in the transition area assures a form-locking enclosing of the cutting plate in this area. This results on the one hand in a high interchangeable exactness and on the other hand in a stabilization of the base body and a constant force coupling of the cutting plate into the base body, without load peaks, as they occur, for example, in the case of edged plate seats.

It has furthermore been proven to be advantageous that the principal cutting edge of the cutting plate and the boundary edge of the seat edge adjacent to the machining face, which boundary edge is on the side of the clearance face, define an angle of 60° to 80° with each other, whereby the principal cutting edge and the respective boundary edge can be connected to each other through a rounded or faceted cutting-edge or edge portion. The principal cutting edge and the boundary edge of the seat edge facing away from the machining face, which boundary edge is on the side of the clearance face, advantageously define on the other hand a radially outwardly converging acute angle of 10° to 30° with each other, whereas the guiding land and the seat edge facing away from the principal cutting edge can be connected to each other through an edge face which is inclined radially inwardly directed with respect to the guiding land. With this plate form it is assured that sufficient material exists outside of the plate seat in the base body, which assures a stable support of the cutting plate on the base body.

The guiding land of the cutting plate is according to a further preferred embodiment of the invention aligned parallel to the drilling axis throughout the plate thickness in the built-in state. The clearance face and the guiding land define thereby advantageously an angle larger than 90° with each other, whereas the angle between the principal cutting edge and the boundary edge of the guiding land, which boundary edge is on the side of the clearance face, is approximately 90°. The guiding land extends thus over the entire plate thickness. In order to obtain a sufficient guiding in the area of the guiding land, the plate thickness should be chosen to be at least 0.2 times the bore radius. The plate thickness corresponds advantageously to 0.2 to 0.5 times the bore radius.

The inventive measures guarantee that the center position of the cutting plates are determined by the plate seat. The hole is thereby oriented within the cutting plate in direction of the drill center, whereby the optimum position of the hole is in the area of the center of gravity of the cutting plate.

An important advantage of the invention is that with one single plate blank it is possible to realize through a simple grinding in the area of the guiding land steplessly varying bore diameters. Thus it is also possible to cover with one and the same base body a larger diameter range than has been possible thus far. Also the diameter graduations in the base body can be chosen larger than the up to now common millimeter spacing.

The invention will be discussed in greater detail hereinafter in connection with one exemplary embodiment schematically illustrated in the drawings, in which:

FIG. 2b illustrates a further fragment of the drilling tool in a position rotated relative to FIG. 2a;

FIGS. 3a and 3b are two side views of the drilling tool;

FIGS. 4a and 4b illustrate two front-face views of the drilling tool;

Figure 1:
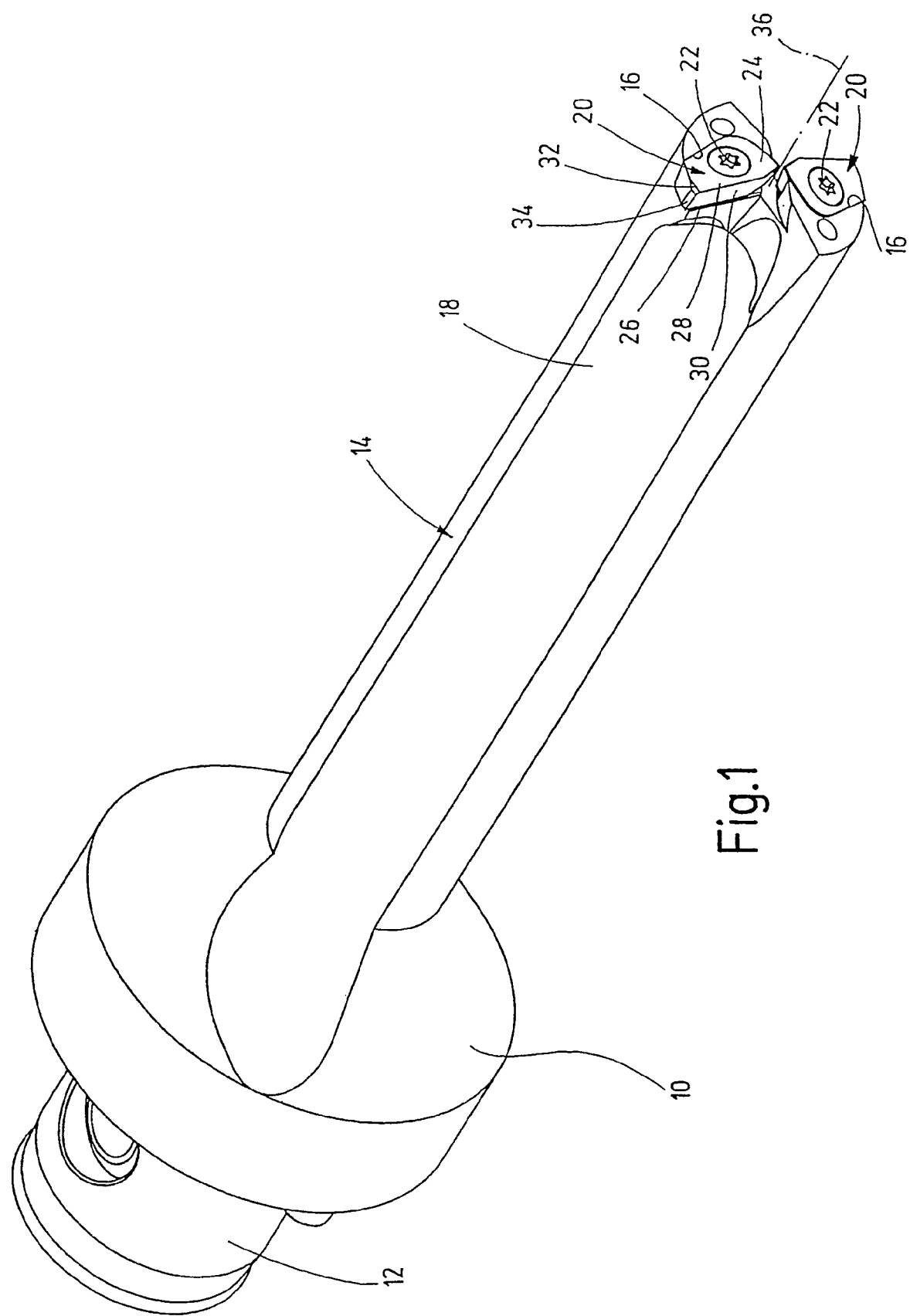
FIG. 1 is a diagrammatic illustration of a drilling tool.
Figure 2A:
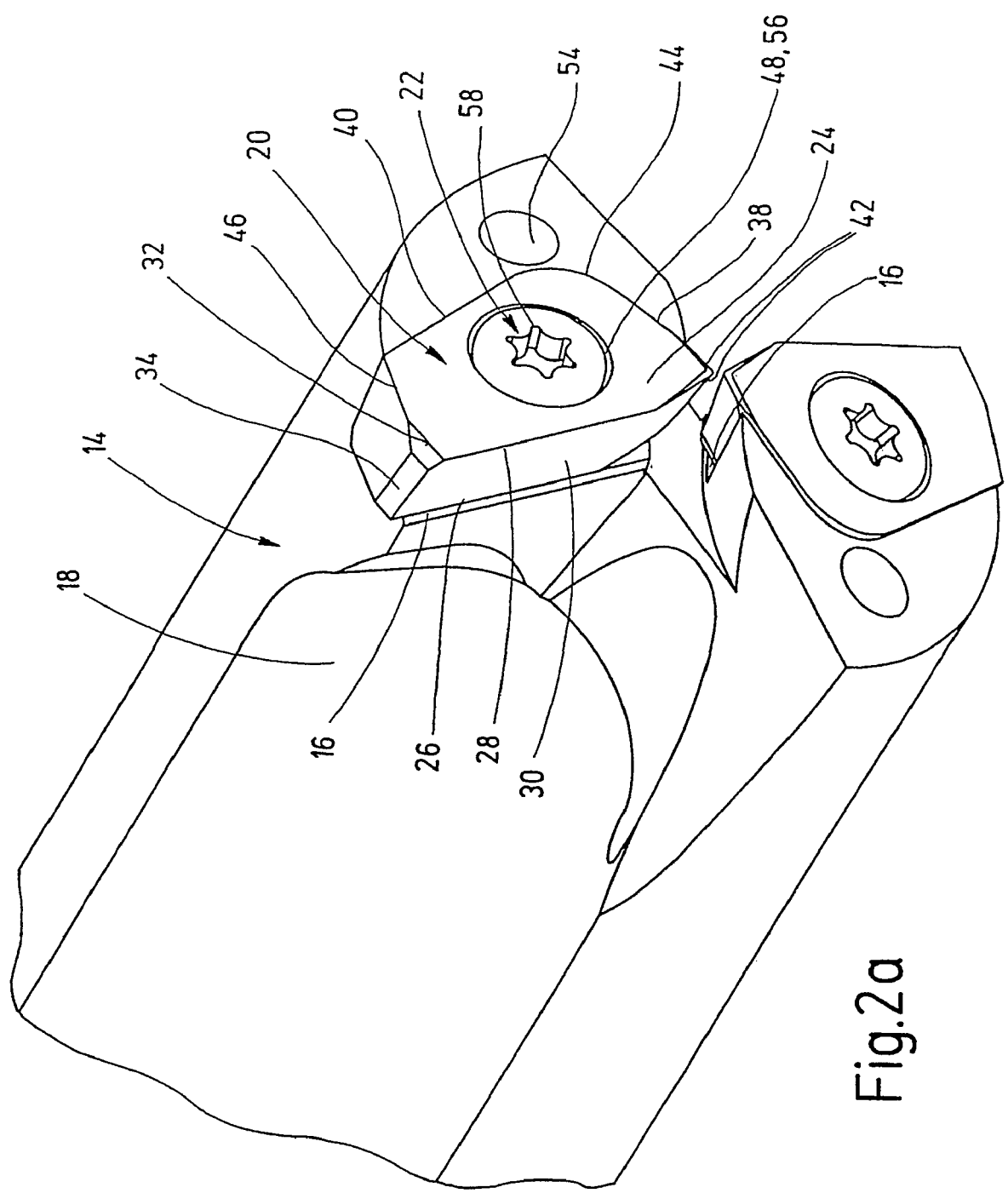
FIG. 2a illustrates an enlarged fragment of FIG. 1.
Figure 2B:
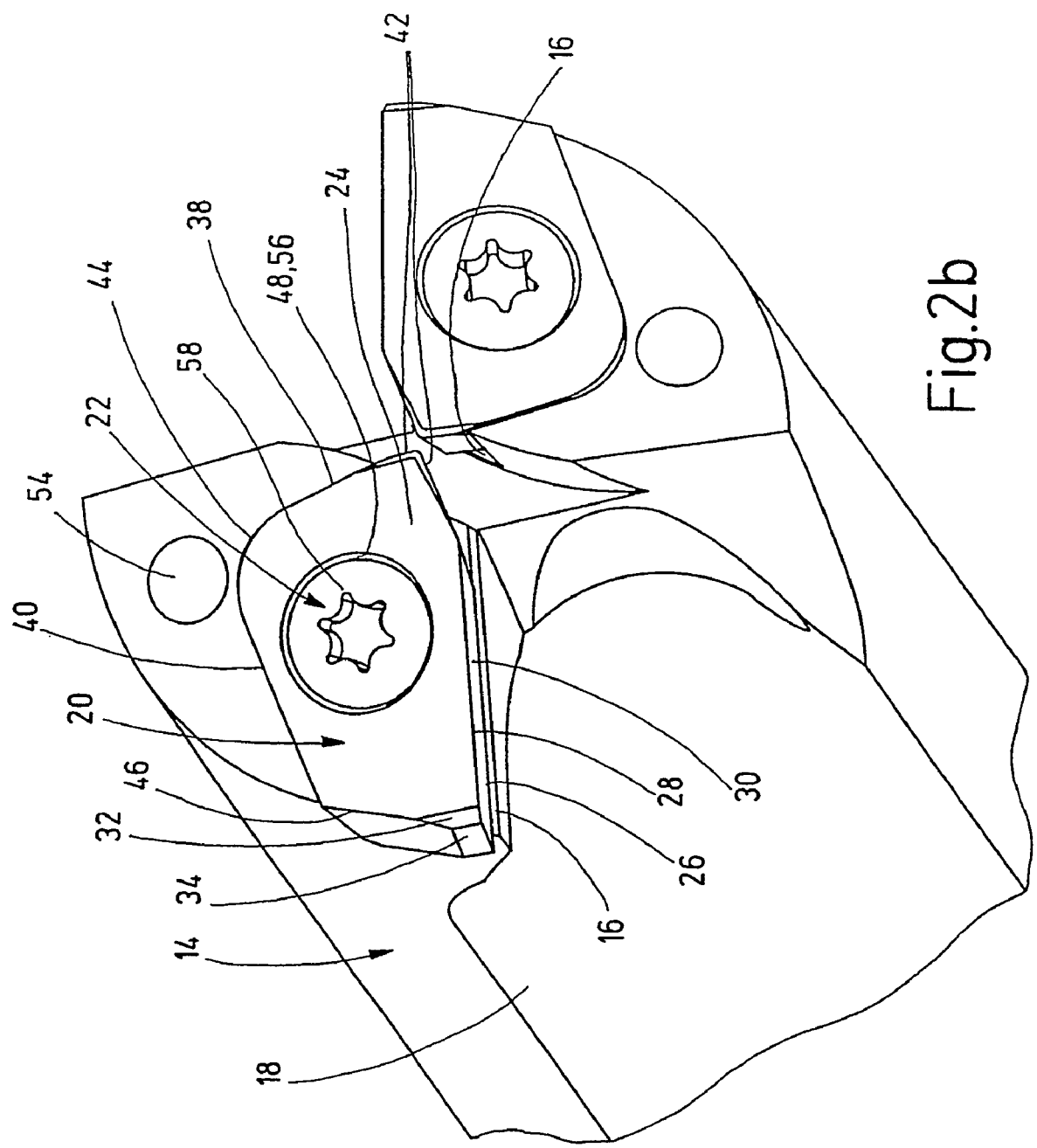

The drilling tool illustrated in the drawings is constructed as a double-edged solid drill. The drilling tool is designated for insertion into machine tools, and has for this purpose a coupling shaft 12 bordered by a coupling flange 10 providing a plane-surface bearing for connection to a machine spindle (not illustrated). An elongated base body 14 is also connected to the coupling flange 10, which base body has two plate seats 16 on the front face, from which plate seats extend chip-conveying grooves 18 over the length of the base body 14. Two cutting plates 20 having the same construction are exchangeably arranged in the plate seat 16 and are fastened to the base body 14 via retaining screws 22.

The cutting plates 20 have a clearance face 24 and a seat face 26 facing away from this clearance face, which faces are arranged in parallel planes. The clearance face 24 is on the side of the chip-conveying groove defined by the principal cutting edge 28 and the following machining face ending in the chip-conveying groove 18. The principal cutting edge 28 and the machining face 30 are followed radially outwardly by an auxiliary cutting edge 32 also designed as a guiding edge and a guiding land 34. The auxiliary cutting edge 32 is formed at an angle of 90° relative to the principal cutting edge, whereas the land 34 is oriented outwardly therefrom over the plate thickness parallel to the drilling axis 36. The lands 34 of the two cutting plates 20 facilitate a guiding of the drilling tool in the drill hole, whereas the point angle of the principal cutting edges 28 of the two cutting plates 20, which can most of all be recognized in FIG. 5b, guarantees a centering of the drill in the drill hole. The cutting plates 20 are furthermore defined by two seat edges 38, 40, which are essentially perpendicular to one another, and of which the one (38) follows the principal cutting edge 28 under an angle of approximately 60° to 80° in the vicinity of the drilling axis, and the other one (40) lies opposite the principal cutting edge 28, and defines with same an outwardly converging angle of 10° to 30°. The principal cutting edge 28 transfers thereby through a rounded or faceted cutting-edge and edge portion 42 over into the seat edge 38, whereas the seat edge 38 and the seat edge 40 are connected to one another through a curved transition portion 44. The radially outer end of the seat edge 40 is followed by a boundary surface 46, which extends inclined radially outwardly with respect to the guiding land.

Figure 5A:
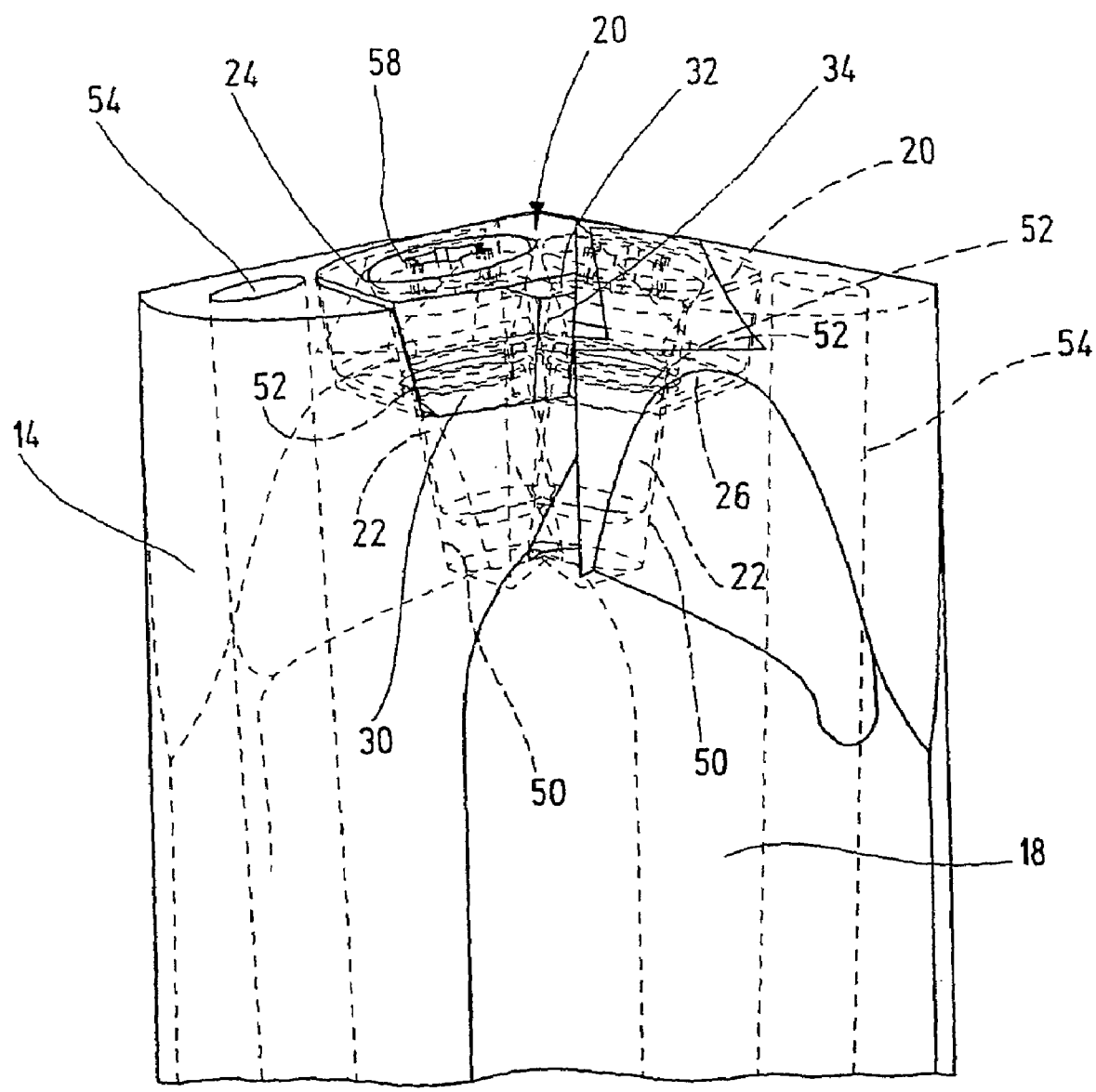
FIGS. 5a and 5b illustrate enlarged fragments of FIGS. 3a and 3b.
Figure 5B:
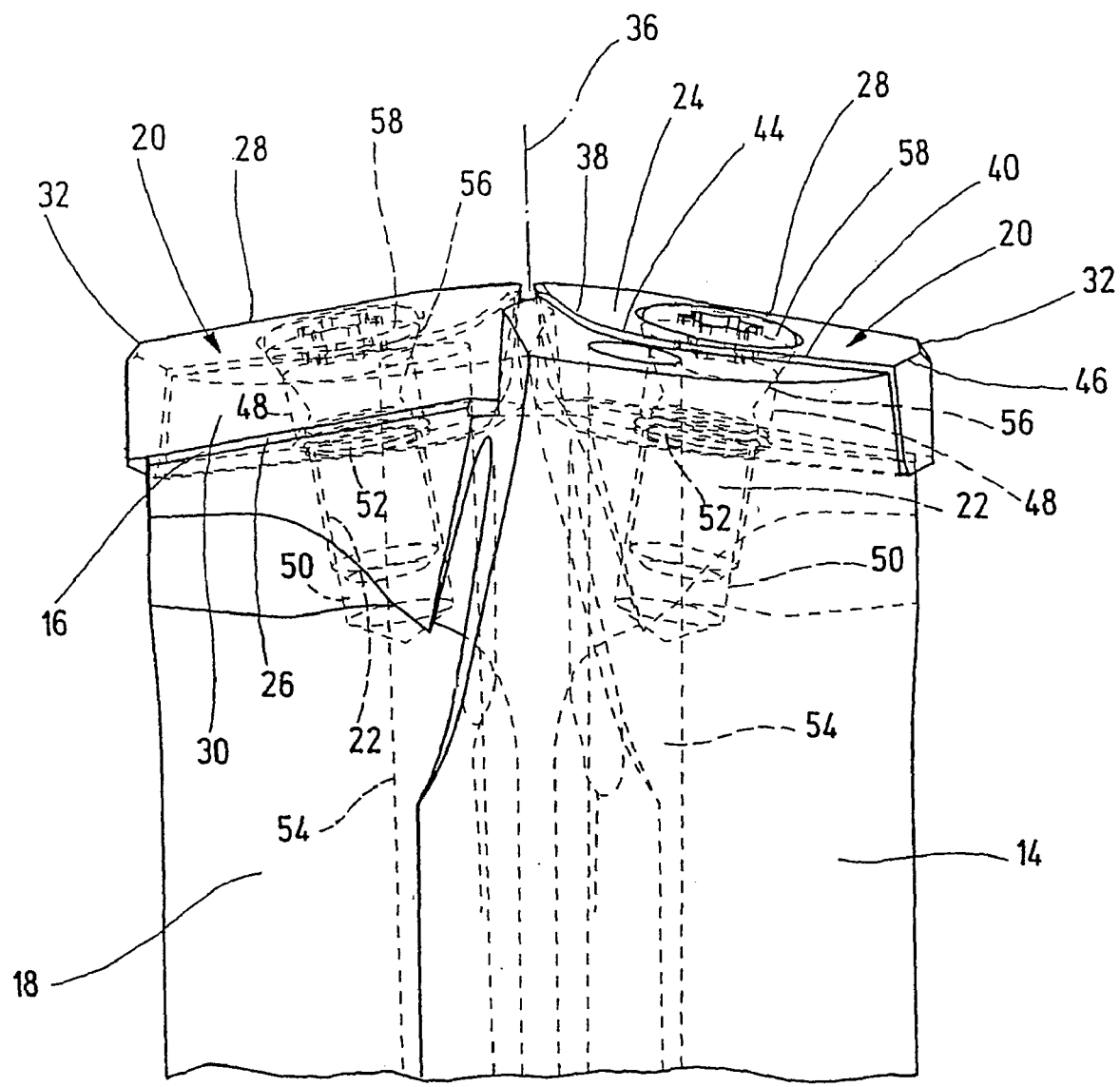
Figure 6:
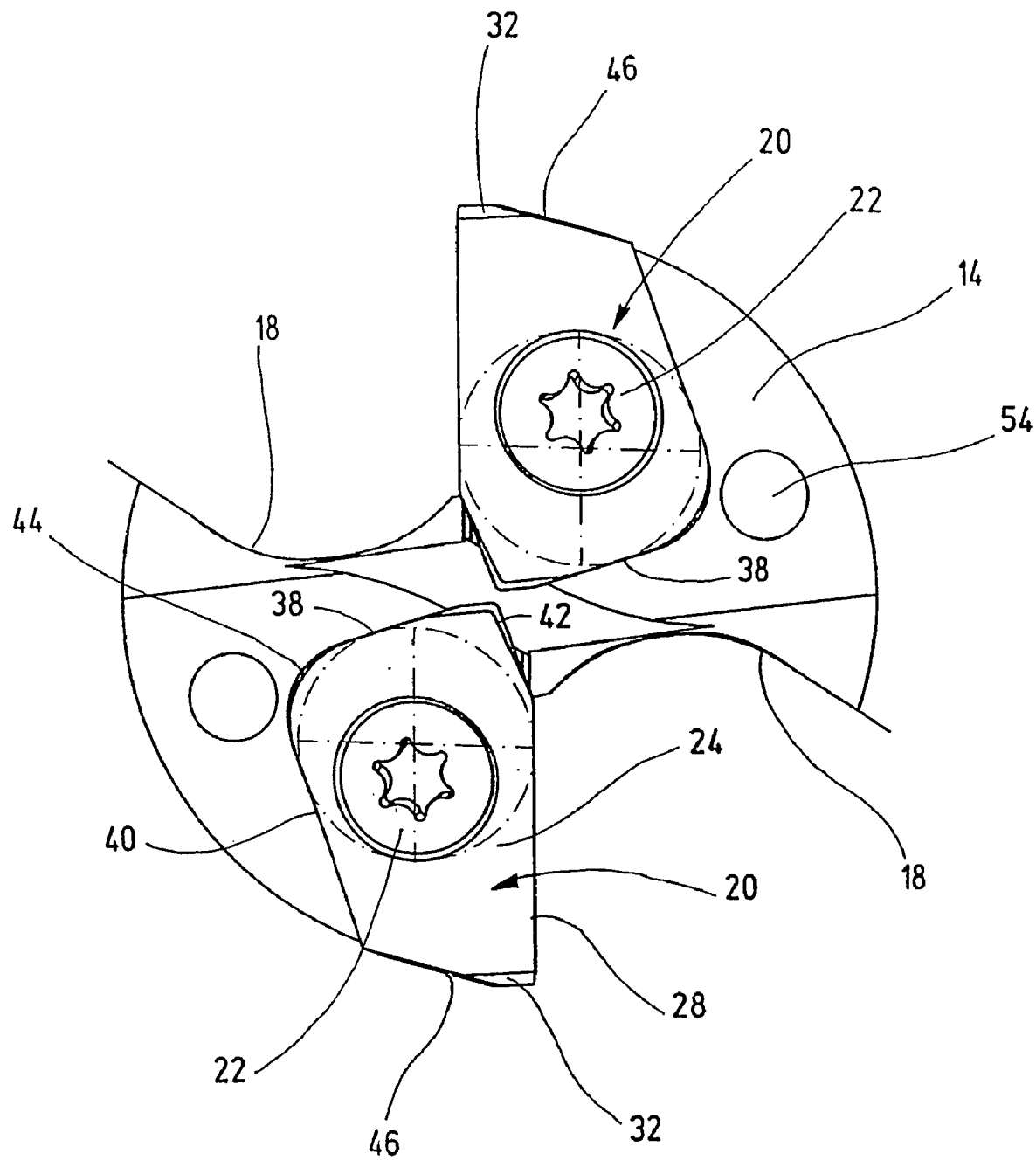
FIG. 6 illustrates an enlarged fragment of FIG. 4b.

The cutting plates are spaced in the mounted state in the area of their principal cutting edges 28 at a very small distance of 0.05 to 0.2 mm from one another. To fix and position the cutting plates 20 in the plate seats 16, the retaining screws 22, which are designed as flat head screws, extend through holes 48 in the cutting plates 20 and are screwed into threaded bores 50 in the base body 14. The holes 48 are aligned with their axes perpendicularly with respect to the clearance face 24 and with respect to the seat face 26 of the cutting plates 20. The threaded bores 50 are accordingly, in order to adjust a defined point angle between the principal cutting edges 28 and a pregiven clearance angle in the area of the clearance face 24, aligned with their axis inclined with respect to the drilling axis 36. As can be seen in FIGS. 5a and 5b, the axes of the threaded bores 50 are aligned inclined with respect to the drilling axis 36 and with respect to one another. They are directed in the base body starting from their front-face opening 52 inclined in direction of an axially parallel plane extending through the principal cutting edge 28 of the associated cutting plate 20, and at the same time inclined in direction of an axially parallel plane which is perpendicular to and extends through the drilling axis 36. Thus the axes of the threaded bores 50 and the drilling axis 36 do not intersect. This is especially illustrated in FIG. 5b wherein the axes of the threaded bores 50 are skewed with respect to each other and the drilling axis 36. The holes 48 for the screws are positioned relatively far from the drilling axis 36, and are oriented in a spaced relation from the principal cutting edge 28 and into the corner areas between the seat edges 38, 40. It is achieved with these measures that the threaded bores 50 are located in an area of the base body 14 with sufficient surrounding material, whereby it is assured that neither the chip—conveying grooves 18 nor the coolant channels 54 are cut into. The retaining screws 22 have a flat head 58, which is fitted into a conical recess 56 in the cutting plate 20, and wherein the recess 56 is positioned in relationship to the seat edges 38, 40 in such a manner that the flat-head fit and the seat fit are reciprocally offset in order to create a press fit. Thus it is possible to position the cutting plates 20 with respect to the drilling axis 36 exactly into the plate seat 16. The desired bore diameter is adjusted by grinding material from the cutting plates 20 in the area of the lands 34. Thus it is possible to steplessly adjust with one single plate blank varying bore diameters.

In order to guarantee at high drilling performances a shatter-free drilling, a minimum plate thickness is needed in order to provide a sufficiently long guiding land, which minimum plate thickness corresponds preferably to 0.2 to 0.5 times the bore radius.

Since the cutting plates do not cut adjacent the drilling axis but are spaced in this area at a distance of <0.2 mm from one another, a minimum slug or peg remains standing there, which is not machined. When this peg has a sufficiently small diameter, it is crumbled during the drilling operation. The distance between the cutting plates is thereby to be adjusted in such a manner than no peg remains standing in the center so that no finish machining is needed even when creating blind-hole bores.

In summary the following is to be stated: The invention relates to a double or multiple-edged drilling tool. The drilling tool has a base body 14 which can be rotated above a drilling axis 36, and in which are arranged on its front face at least two plate seats 16 to accommodate identical interchangeable cutting plates 20. The interchangeable cutting plates each have a machining face 30 and a clearance face 24 which adjoin a principal cutting edge 28 to form a cutting wedge, and a seat face 26 which faces away from the clearance face. A land 34 is also provided which adjoins radially on the outside through each edge thereof the machining face 30, the clearance face 24 and optionally the seat face 26, and with which land the guiding of the drilling tool in the drill hole is supported. The cutting plates 20 are pierced by a hole 48 for a retaining screw 22 in the area of the clearance face 24 and of the seat face 26. The retaining screw is screwed into a threaded bore 50 which opens into the front face of the base body 14 in the area of the plate seat. The axes of the holes 48 are according to the invention aligned perpendicularly to the clearance face 24 and preferably to the seat face 26 of the associated cutting plates 20, whereas the axes of the threaded bores 50 are aligned inclined with respect to the drilling axis 36 and inclined to each other.

The invention claimed is:

1. A drilling tool comprising:
   a base body rotatable about a drilling axis and having at least two plate seats arranged on a front face thereof;
   cutting plates capable of being interchangeably inserted into the plate seats, the cutting plates each having a machining face and a clearance face adjoining a principal cutting edge, a seat face facing away from the clearance face, and a guiding land adjoining radially on the outside through each edge the machining face and the clearance face, the cutting plates each having a hole that extends through the clearance face and the seat face for receiving a retaining screw, the retaining screw capable of being screwed into threaded bores that open to the front face of the base body in the area of a respective one of the plate seats, wherein each of the holes have their axis aligned perpendicularly to the clearance face of the associated cutting plates, and wherein the axes of the threaded bores are aligned inclined with respect to the drilling axis and inclined to each other in the base body,
   wherein the clearance face and the seat face of the cutting plates are aligned in parallel planes, and the axis of the hole is aligned perpendicularly to the seat face, and
   wherein the axes of the threaded bores are aligned inclined to the drilling axis and to each other, and the axes of the threaded bores in the base body are oriented so that the axes thereof do not intersect the drilling axis and do not intersect each other.

2. The drilling tool according to claim 1, wherein the threaded bores in the base body are directed from their front-face opening inclined in direction of an axis-parallel plane extending through the principal cutting edge of the associated cutting plate, and inclined in direction of an axis-parallel plane perpendicular to and extending through the drilling axis.

3. The drilling tool according to claim 1, wherein the adjacent cutting plates are spaced in the area of the drilling axis at a distance of less than 0.2 mm from each other.

4. The drilling tool according to claim 3, wherein the guiding land and a seat edge facing away from the principal cutting edge are connected with each other through a boundary edge directed inclined radially inwardly with respect to the guiding land.

5. The drilling tool according to claim 1, wherein the holes in the cutting plates have a conical recess, the retaining screws each having a flat head fitting into the conical recess in the respective cutting plate, and each said flat-head and each said plate seat are reciprocally offset to create a press fit.

6. The drilling tool according to claim 1, wherein the guiding lands of the cutting plates are ground off.

7. The drilling tool according to claim 1, wherein a first seat edge connects to a second seat edge through a rounded transition portion.

8. The drilling tool according to claim 1, wherein the clearance face and the guiding land define an angle larger than 90° with each other.

9. The drilling tool according to claim 1, wherein the cutting plates are arranged mirror-inverted with respect to the drilling axis on the base body.

10. The drilling tool according to claim 1, wherein each said machining face of the cutting plates is aligned with a boundary surface of chip-conveying grooves arranged in the base body.

11. The drilling tool according to claim 1, wherein in the base body in the spacing between the two plate seats there is formed a deflecting incline extending from the cutting plates and ending in one of chip-conveying grooves and arranged asymmetrically with respect to the drilling axis.

12. The drilling tool according to claim 1, wherein the threaded bores are skewed with respect to each other and both of the threaded bores are skewed with respect to the drilling axis.

13. A drilling tool comprising:
   a base body rotatable about a drilling axis and having at least two plate seats, arranged on a front face thereof;
   cutting plates capable of being interchangeably inserted into the plate seats, the cutting plates each having a machining face and a clearance face adjoining a principal cutting edge, a seat face facing away from the clearance face, and a guiding land adjoining radially on the outside through each edge the machining face and the clearance face, the cutting plates each having a hole that extends through the clearance face and the seat face for receiving a retaining screw, the retaining screw capable of being screwed into threaded bores that open to the front face of the base body in the area of a respective one of the plate seats, wherein each of the holes have their axis aligned perpendicularly to the clearance face of the associated cutting plates, and wherein the axes of the threaded bores are aligned inclined with respect to the drilling axis and inclined to each other in the base body, wherein the cutting plates include a first and a second seat edge, the two seat edges defining an angle of 80° to 100° with each other, wherein the principal cutting plate and a boundary edge of the seat edge adjacent to the machining face define an angle of 60° to 80° with each other, and said boundary edge is on the side of the clearance face, and wherein the principal cutting edge and the boundary edge of the seat edge facing away from the machining face define a radially outwardly converging acute angle of 10° to 30° with each other.

14. The drilling tool according to claim 13, wherein the principal cutting edge is connected with the boundary edge of the seat edge adjacent to the machining face through a rounded or faceted cutting-edge and edge portion.

15. The drilling tool according to claim 13, wherein the axes of the threaded bores are skewed with respect to the drilling axis and with respect to each other.

16. An interchangeable cutting plate for double or multiple-edged drilling tools having a principal cutting edge, comprising:

a machining face and a clearance face each adjoining the principal cutting edge to form a cutting wedge;

a seat face facing away from the clearance face;

a guiding land adjoining outwardly through edges thereof with the machining face, the clearance face and the seat face; and a hole for a retaining screw, the hole extending through the clearance face and the seat face, wherein the clearance face and the seat face are arranged in parallel planes and are pierced through by the hole, and that at least two seat edges defining an angle of 80° to 100° with each other are provided, of which the one seat edge defines an angle of 60° to 80° with the principal cutting edge and the other seat edge defines an outwardly converging angle of 10° to 30° with the principal cutting edge, and wherein an auxiliary cutting edge arranged in the area of the guiding land and the seat edge facing away from the principal cutting edge are connected with each other through a boundary edge directed inclined inwardly with respect to the auxiliary cutting edge.

17. The interchangeable cutting plate according to claim 16, wherein the hole is oriented a distance from the guiding land and closer in direction of the one seat edge.

18. The interchangeable cutting plate according to claim 16, wherein the guiding land is ground off.

19. The interchangeable cutting plate according to claim 16, wherein the machining face is connected with the adjacent seat edge through a rounded or faceted cutting-edge and edge portion.

20. The interchangeable cutting plate according to claim 16, wherein the seat edges are connected with each other through a rounded or faceted corner.

21. A drilling tool comprising:

a base body rotatable about a drilling axis and having two plate seats arranged on a front face thereof, each said plate seat having a threaded bore that opens to the front face of the base body, each said threaded bore having a bore axis;

interchangeable cutting plates for insertion in the plate seats, the cutting plates each having a machining face and a clearance face adjoining a principal cutting edge, the cutting plates each having a seat face facing away from the clearance face, each said cutting plate having a guiding land adjoining radially on the outside through each said edge the machining face, the clearance face and the seat face, each said one of the cutting plates having a hole that extends through the clearance face and the seat face, each said hole having its axis aligned perpendicularly to the clearance face of the respective cutting plate; and retaining screws screwed into the respective threaded bores to secure the cutting plates to the base body, wherein the bore axes of the threaded bores are inclined with respect to each other in the base body and the bore axes of the threaded bores do not intersect the drilling axis of the base body.

22. The drilling tool according to claim 21, wherein the bore axes of the threaded bores are skewed so that the bore axes do not intersect each other.

* * * * *